United States Patent
Banning et al.

(10) Patent No.: US 7,096,460 B1
(45) Date of Patent: *Aug. 22, 2006

(54) SWITCHING TO ORIGINAL MODIFIABLE INSTRUCTION COPY COMPARISON CHECK TO VALIDATE PRIOR TRANSLATION WHEN TRANSLATED SUB-AREA PROTECTION EXCEPTION SLOWS DOWN OPERATION

(75) Inventors: John Banning, Sunnyvale, CA (US); H. Peter Anvin, San Jose, CA (US); Robert Bedichek, Palo Alto, CA (US); Guillermo J. Rozas, Los Gatos, CA (US); Andrew Shaw, Sunnyvale, CA (US); Linus Torvalds, Santa Clara, CA (US); Jason Wilson, San Francisco, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/463,846

(22) Filed: Jun. 16, 2003

Related U.S. Application Data

(63) Continuation of application No. 09/539,987, filed on Mar. 30, 2000, now Pat. No. 6,594,821.

(51) Int. Cl.
*G06F 9/455* (2006.01)
*G06F 9/318* (2006.01)

(52) U.S. Cl. .................................... 717/136; 712/226
(58) Field of Classification Search .................. 703/26; 717/136, 138, 139
See application file for complete search history.

(56) References Cited

U.S. PATENT DOCUMENTS

| | | | | |
|---|---|---|---|---|
| 5,832,205 A * | 11/1998 | Kelly et al. | ................... | 714/53 |
| 5,875,318 A * | 2/1999 | Langford | ....................... | 716/3 |
| 6,199,152 B1 * | 3/2001 | Kelly et al. | ................. | 711/207 |
| 6,363,336 B1 * | 3/2002 | Banning et al. | ............. | 703/26 |
| 6,415,379 B1 * | 7/2002 | Keppel et al. | ............. | 712/209 |
| 6,704,925 B1 * | 3/2004 | Bugnion | .................... | 717/138 |

* cited by examiner

*Primary Examiner*—Kenneth S. Kim

(57) ABSTRACT

In a computer system that translates target instructions from a target instruction set into host instructions from a host instruction set, a method for checking a sequence of target instructions for changes. The method includes testing whether the target instructions at a memory location have changed subsequent to the translating by examining a bit indicator associated with the memory location and determining whether the testing is slowing the operation of the computer system. If the testing is slowing the operation of the computer system, a checking process initiated, which includes storing a copy of the sequence of target instructions and comparing the copy with the sequence of target instructions.

12 Claims, 4 Drawing Sheets

SWITCHING TO ORIGINAL MODIFIABLE INSTRUCTION COPY COMPARISON CHECK TO VALIDATE PRIOR TRANSLATION WHEN TRANSLATED SUB-AREA PROTECTION EXCEPTION SLOWS DOWN OPERATION

This is a continuation of application(s) Ser. No. 09/539,987 filed on Mar. 30, 2000 now U.S. Pat. No. 6,594,821 which is hereby incorporated by reference to this specification

BACKGROUND OF THE INVENTION

1. Field of the Invention

This invention relates to computer systems and, more particularly, to methods and apparatus for assuring consistency of translated instructions being executed by a microprocessor which dynamically translates instructions from a target to a host instruction set.

2. History of the Prior Art

Recently, a new microprocessor was developed which combines a simple but very fast host processor (called a "morph host") and software (referred to as "code morphing software") to execute application programs designed for a processor having an instruction set different than the instruction set of the morph host processor. The morph host processor executes the code morphing software which translates the application programs dynamically into host processor instructions that are able to accomplish the purpose of the original software. As the instructions are translated, they are stored in a translation buffer where they may be executed without further translation. Although the initial translation of a program is slow, once translated, many of the steps normally required for hardware to execute a program are eliminated. The new microprocessor has proven able to execute translated "target" programs as fast as the "target" processor for which the programs were designed. The morph host processor includes a number of hardware enhancements which allow sequences of target instructions spanning known states of the target processor to be translated into host instructions, stored for further use in the translation buffer, and tested to determine if the translated instructions will execute correctly. These hardware enhancements allow the buffering of the effects of execution of translations until execution has succeeded. Memory stores and target processor state are updated upon successful execution in a process referred as "committing." These hardware enhancements allow the rapid and accurate handling of exceptions which occur during the execution of the sequences of host instructions by returning execution to the beginning of a sequence of instructions at which known state of the target processor exists. Returning the operations to a point in execution at which target state is known is called "rollback." The new microprocessor is described in detail in U.S. Pat. No. 5,832,205, Memory Controller For A Microprocessor For Detecting A Failure Of Speculation On The Physical Nature Of A Component Being Addressed, Kelly et al, Nov. 3, 1998, assigned to the assignee of the present invention.

One problem which can arise with the new processor is that it is possible with some target programs to write to target instructions stored in memory. If this happens, the host instructions which are translations of the target instructions which have been overwritten may no longer be valid. In order to assure that invalid host translations are not executed, the new processor utilizes an indicator termed a "T bit." A T bit is set to indicate a physical page address in memory which stores target instructions which have been translated into host instructions. If a write is attempted to a memory page protected by a T bit, a T bit exception is generated. A T bit exception causes an exception handler to look up a data structure which holds references to addresses of host instructions translated from the target instructions on the page protected by the T bit. The exception handler invalidates these host translations and turns off the T bit protection for the memory page. The arrangement for utilizing T bits is described in detail in U.S. patent application Ser. No. 08/702,771, entitled Translated Memory Protection Apparatus For An Advanced Microprocessor, Kelly et al, filed Aug. 22, 1996, and assigned to the assignee of the present invention.

The arrangement which utilizes T bits to indicate memory pages storing target instructions which have been translated was refined to address problems in operation which occurred in translating programs designed for target processors employing operating systems which do not discriminate between areas in which instructions and data are stored. For example, Microsoft Windows allows instructions and data to be stored on the same memory pages. When an attempt is made to write to data on a memory page protected by the T bit arrangement described above, a T bit fault occurs. The resulting exception causes all translations of target instructions on the protected memory page to be invalidated even though a write to data does not change any target instruction. Similarly, an attempt to write to one target instruction on a memory page does not affect the validity of translations from other target instructions stored on the same memory page. Invalidating correct translations on a memory page protected by a T bit significantly slows the operation of the new microprocessor.

In order to overcome these difficulties, a process which allows finer grain discrimination between memory areas storing data and areas storing target instructions was implemented. The improved process detects writes to a memory page storing target instructions which have been translated to host instructions, detects whether a sub-area of the memory page to which a write is addressed stores target instructions that have been translated, and invalidates host instructions translated from target instructions at an addressed protected sub-area. The process improves the operational speed of the new microprocessor by eliminating the invalidation of translations which are not affected by writes to memory pages protected by T bits and reduces the number of T bit traps taken that do not cause invalidation of translations. The process is described in detail in U.S. patent application Ser. No. 09/417,356, entitled Fine Grain Translation Discrimination, Banning et al, filed Oct. 13, 1999, and assigned to the assignee of the present invention.

Although the improved arrangement functions quite well in most circumstances, there are situations in which additional improvement is desirable. For example, there are situations in which a write to a memory address having fine grain T bit protection initiates the T bit process to invalidate a translation even though the write is to a portion of the memory sub-area which stores data. This occurs because the sub-areas protected by fine grain T bits are still larger than the area which may be addressed. There are other situations in which a data portion of an instruction is constantly being changed although the instruction is not. Other situations also arise in which fine grain T bit protection causes system operation to slow significantly. For example, sometimes T bit exceptions generated by writes to particular sub-areas occur so frequently that the T bit method of invalidating translations simply slows the system too much.

It is desirable to increase the computer system operating speed by improving the operation of the system for assuring the consistency of translations of instructions.

SUMMARY OF THE INVENTION

It is, therefore, an object of the present invention to improve the operating speed of a microprocessor capable of running programs designed for other microprocessors while maintaining consistency between target instructions and host translations of those target instructions.

This and other objects of the present invention are realized by a method for determining whether target instructions which have been translated to host instructions have changed since being translated, including the steps of storing a copy of a target instruction which has been translated to host instructions, comparing the copy of the target instruction which has been translated with data at a memory address at which the target instruction was stored when translated when an attempt to execute the host instructions occurs, and invalidating host instructions translated from a target instruction if the data at the memory address and the copy of the target instruction differ.

These and other objects and features of the invention will be better understood by reference to the detailed description which follows taken together with the drawings in which like elements are referred to by like designations throughout the several views.

BRIEF DESCRIPTION OF THE DRAWINGS

FIG. 4 is a diagram illustrating the operation of another embodiment of the present invention.

DETAILED DESCRIPTION

Figure 1:
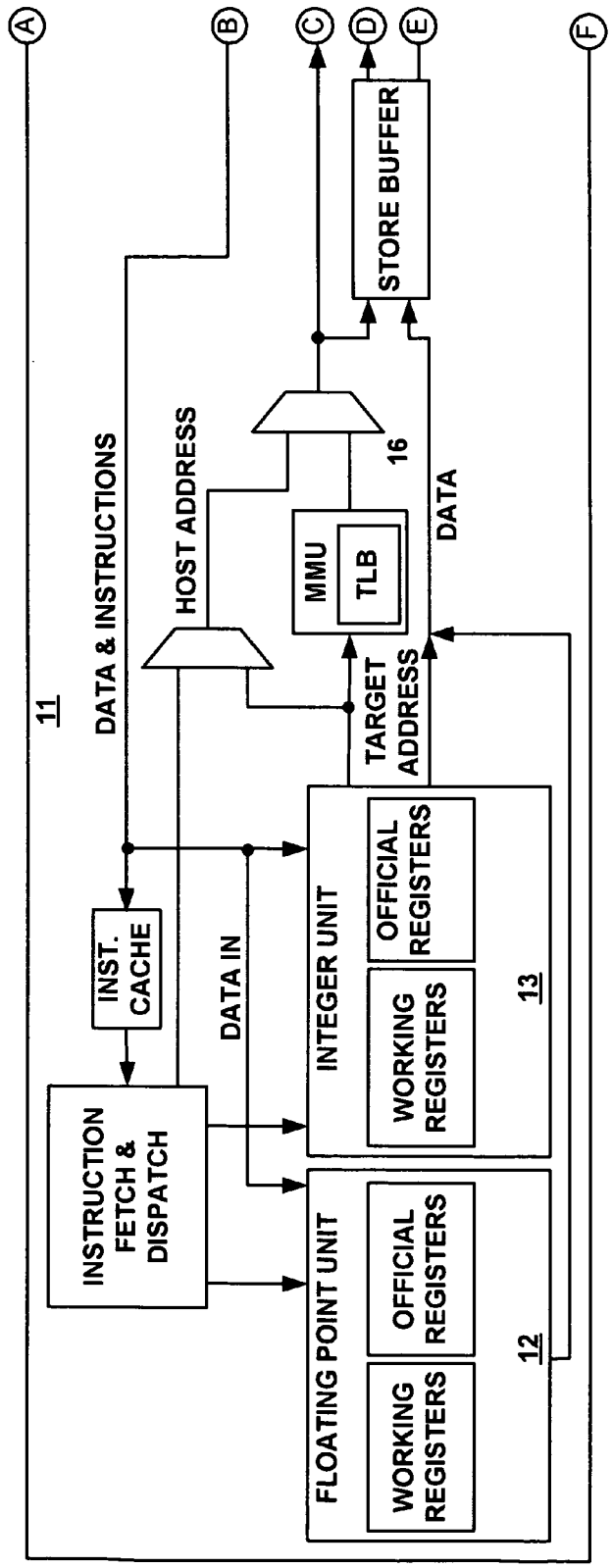
FIG. 1 is a block diagram illustrating the new microprocessor which is adapted to carry out the present invention.
Figure 1:
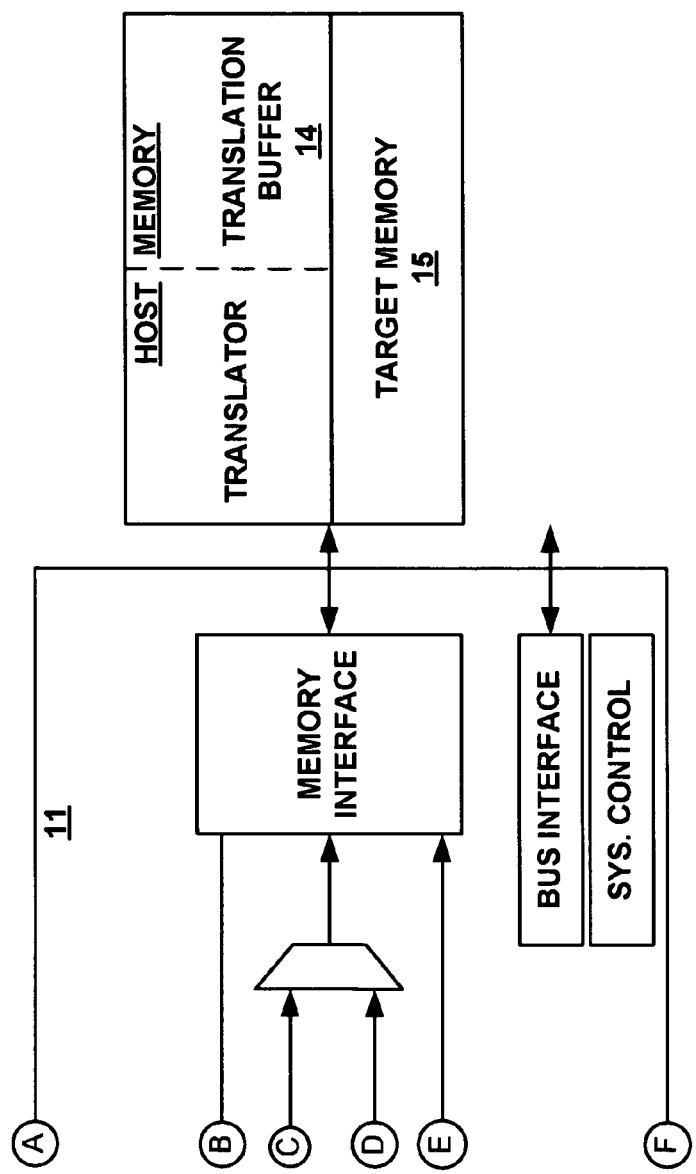

FIG. 1 illustrates a microprocessor 11 which may utilize the present invention. The microprocessor pictured is described in detail in U.S. Pat. No. 5,832,205. The microprocessor includes a floating point unit 12, an integer unit 13, a translation buffer 14 which is a part of system memory, target memory 15 which is another portion of system memory, and a translation lookaside buffer 16 which is a part of a memory management unit.

As described above, the new microprocessor utilizes a unique method for assuring that translated host instructions remain consistent with the target instructions from which they were translated. The method utilizes what is referred to as a "T bit exception." A T bit enabled in an entry in the translation lookaside buffer 16 signals that a memory page in target memory 15 to which a write is attempted stores target instructions which have been translated into host instructions stored in translation buffer 14. A T bit causes an exception to be generated when there is an attempt to write to a memory page which stores the target instructions that have been translated.

The T bit exception allows translated host instructions to be invalidated when there has been a change in the target instructions from which the host instructions were translated. However, some target processors (notably the X86 family) utilize operating systems such as Microsoft Windows which allow both instructions and data to exist on the same memory pages. If the act of writing data to a memory page does not alter target instructions on the page, there is no reason to invalidate host instructions translated from instructions on the memory page. Moreover, a write to one target instruction on a memory page does not necessarily affect other target instructions on that memory page and require that host instructions translated from the other target instructions be invalidated. For this reason, a refined T-bit process has been devised by which the code morphing software may determine whether an attempted write to a memory page is to target instructions which have been translated so that writes to data may occur without invalidating host translations of target instructions on the memory page.

The new process also limits the effect of writes to instructions on the page to areas of the memory page actually written.

The process by which this is accomplished provides a finer grain T bit protection for memory pages storing target instructions. The process divides protected pages into a plurality of sub-areas and stores indicators for each of the sub-areas of such memory page. The indicators for each sub-area which is protected are referred to as "fine-grain T bits." In one embodiment, each fine-grain T bit protects a 128 byte sub-area of a 4096 byte memory page. For each sub-area which includes target instructions that have been translated, a fine-grain T bit is enabled.

When a T bit exception occurs, the exception handler tests the indicators to determine if fine grain T bit protection has been provided for the memory page to which the write is being attempted. If a write occurs to a memory page which has not been divided into sub-areas (e.g., only target instructions have been written to the page), a T bit exception causes all host translations of target instructions on this memory page to be invalidated. If the memory page has been divided into fine-grain T bit sub-areas and a lookup shows that the write is to one or more sub-areas not designated by a fine-grain T bit, then the original T bit exception is ignored by the software. If the memory page has been divided into sub-areas and the lookup shows that the write is to one or more sub-areas protected by a fine grained T bit (an area storing translated instructions), the original T bit exception is affirmed; and the exception handler invalidates the host instructions stored in the translation buffer translated from target instructions stored in the particular sub-area on the protected memory page.

Fine-grain T bit protection eliminates a significant proportion of the T bit exceptions generated by the new processor. Fine-grain T bit protection also limits the translations discarded to those in sub-areas to which a write is attempted. Thus, the process is much faster than constantly discarding entire memory pages.

Even though the fine-grain T bit protection process works well in most situations, it does not eliminate all problems related to writing to memory pages including target instructions which have been translated. For example, limiting T-bit protection to small sub-areas of memory pages does not eliminate all unnecessary and time consuming T bit faults because the sub-areas are not small enough so that each can include only a single target instruction. Moreover, even with fine-grain T bit protection, writes to some T bit protected sub-areas occur so frequently that the T-bit protection process is not really feasible.

An improved protection process has been devised which allows operations to be further accelerated. The improved process combines a number of processes to progressively overcome the various problems which may arise.

The improved protection process of this invention may utilize any of a number of techniques for choosing when the T bit process should be modified. The techniques may be chosen to measure when the different problems discussed above have adversely affected the operation of the fine-grain T bit system. For example, to determine when the process requires modification, a technique might measure the frequency with which fine-grain T bit exceptions occur for writes to data areas of target memory. Another technique might measure the frequency at which fine-grain T bit exceptions occur for writes to target instructions which have not been translated yet are stored in T bit protected sub-areas. A similar test might check for writes to T bit protected areas to modify data. Another technique might simply measure the number of fine-grain T bit exceptions for a page of target memory. One variation of this last technique might launch the modification process whenever a fine-grain T bit exception occurs. All of these techniques indicate some problem with the T bit protection process which would be lessened by initiating the improved process.

In any case, as a first step in the process (shown in FIG. 2), one or more of these or other tests are put in place to determine when the normal fine-grain T bit protection scheme is not functioning efficiently. When a test indicates that the fine-grain T-bit process is not functioning efficiently, the code morphing software process replaces the T-bit protection process with a process which uses one of the methods described in this patent. Each of the methods described replaces or modifies the fine-grain T-bit protection process in some manner in order to obviate the problem which is occurring. In general, each of these methods causes a copy of the original target instructions (which have been translated and would normally be protected by the fine grain T bit process) to be placed in host memory along with the host translation of the target instruction. Each method also provides a process for checking the stored copy of a target instruction against the target instruction at the target memory address in order to make sure that the translation is valid when the host instruction is to be executed. There are many variations on this basic theme.

Figure 3:
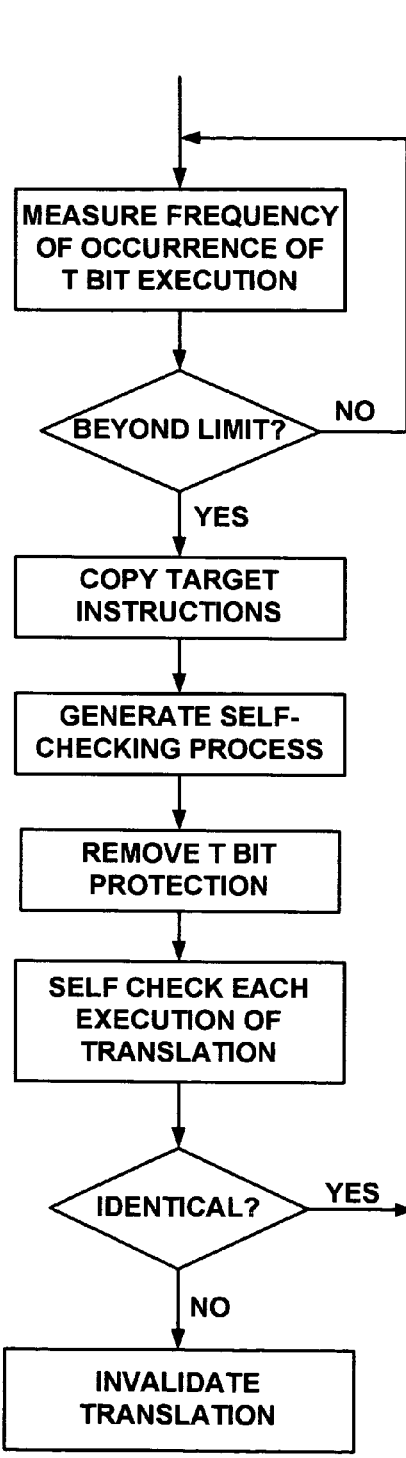
FIG. 3 is a flow chart illustrating the operation of one embodiment of the present invention.

The most basic of these methods is referred to as "self-checking." A self-checking process such as that illustrated in FIG. 3 may be utilized to assure that any translation is still valid when it is to be executed. One embodiment for carrying out self-checking utilizes a simple T-bit exception generated by a write to a translated target instruction as a technique for identifying when a translation is a problem translation and causing a copy of the target instructions to be copied and the self-checking process to replace fine-grain T bit protection for the particular instructions.

Once the self-checking process has been put in place, the next attempt to execute the host translation initiates a comparison of the copy of the original target instructions from which the translation was generated with the target instructions presently at the target memory address. If the instructions are the same, then the host translation is still correct and execution takes place. If the instructions are different, then the translation is invalidated.

The self-checking process replaces T bit protection entirely for the particular translation sub-area. If all of the target instructions in the sub-area which have been translated are using the self-checking process, then fine-grain T bit protection may be removed for that sub-area. With T bit protection removed, an attempt to write the target memory sub-area will be effective. Thus, data may be written to the sub-area. Since a write to a data area does not affect the target instruction from which the translation was made, the self check test will be passed on the next attempt to execute the host translation. However, if any write occurs to the target instruction, the self-check test will fail on the next attempt to execute the translation. The self checking process remains in place until it fails and the translation is invalidated.

The basic self-checking process is effective in reducing the number of times invalidation of translations occurs where writes to target memory occur frequently but are to data areas within T-bit protected sub-areas of target memory or are to instructions in a T-bit protected sub-area which are not related to the translation being executed. Self-checking is also effective in reducing the time required by the T-bit protection process in cases in which T-bit exceptions are occurring so frequently that system operations are significantly slowed.

However, the basic self-checking process itself cannot handle certain situations. When the instructions being executed include a store operation to target memory, the basic self-checking process is problematic because the store instruction may be modifying the code which is presently being executed. If the self-check occurs before the store is executed and the store changes the target instructions, then the comparison is not effective to detect an invalid translation. On the other hand, if the store occurs before the comparison, then it may change an instruction which would not have compared before the store to one which does compare after the store. Again, the result of the comparison is incorrect.

One way to solve this problem is to end the translation after each store instruction. However, store instructions do not necessarily cause the translation to be incorrect. A preferred way to obviate this problem, is to utilize a refined self-checking process. This process, referred to as "incremental self-checking," is illustrated in FIG. 4 of the drawing. In this process, the self-checking process is apportioned into increments in which those copied instructions that represent the translated instructions being executed and which precede the store instruction together with the store instruction are self-checked before the store operation is executed. This assures that the translated instructions which would be executed before the store operation and might be changed by the store operation are compared before they can be changed. On the other hand, those of the translated instructions which follow the store operation are self-checked after the store operation but before their execution so the result of the store is also taken into account by the checking for these instructions. In this manner, the self-checking is done on exactly the instructions that would be fetched and executed by a native implementation of the target instruction set.

FIG. 4 is a diagram which illustrates the incremental self-checking process as applied to a translation including five instructions A–E. The instructions A, B, and C (the last of which is a store instruction) are self-checked before the store operation of instruction C is executed. After checking, the three instructions A, B, and C are executed. Next, the instructions D and E are self checked and, if still the same as the incremental instructions with which they are being compared, then they are executed. Since the self-check of instructions D and E occurs after the store, the test will determine if the host instructions translated from target instructions represented by D and E remain the same and are therefore valid for execution after the store has taken place.

Thus, incremental self-checking may be utilized for testing validity before the execution of translations which include an instruction which stores to target memory.

It should be noted that the execution and the checking of the instructions A, B, and C can be intermixed as long as the checking is finished before the store is done for instruction C. Instructions D and E can be treated similarly. Further, if the host machine has hardware that allows reordering of loads and stores by detecting conflicts between the loads and stores (see U.S. patent application Ser. No. 09/332,338, enititled Method and Apparatus for Enhancing Scheduling in an Advanced Microprocessor, Rozas et al, filed Jun. 14, 1999, and assigned to the assignee of the present invention), then such hardware can be used to move the loads used for comparing instructions such as A, B, and C to a point after the store for instruction C.

In order to assist in the incremental self-checking operation, the embodiment illustrated in FIG. 4 utilizes a pair of registers Rx and Rp to store, respectively, the addresses of the target instructions in target memory and the addresses of the copies of the target instructions in host memory. The addresses of the instructions in each of the registers are advanced as the instructions at the two addresses are compared. This manner of implementing the incremental self-checking process allows the size of the code used to be held to a minimum.

Target instructions may include data fields (called immediate or displacement fields) which are used in the operation of the instruction. Some times these fields are changed by other parts of the target program even though the remainder of the instruction remains constant. Typically, prior art methods translate each of these target instructions into host instructions which also include data fields. Because such host translations include data fields which change when data in the target instruction changes, the host translations must be retranslated whenever the data field of the target instruction changes. To accomplish to this, a T bit exception is generated, the translation is discarded, and a new translation is generated. This is time consuming and slows the operation of the new microprocessor.

The self-checking process of the present invention does not solve this problem in its basic form. However, the self-checking process of the present invention may be refined to obviate the slowing caused by either T-bit exceptions or self-checking failures generated in response to changes only in the data fields of target instructions.

Figure 2:
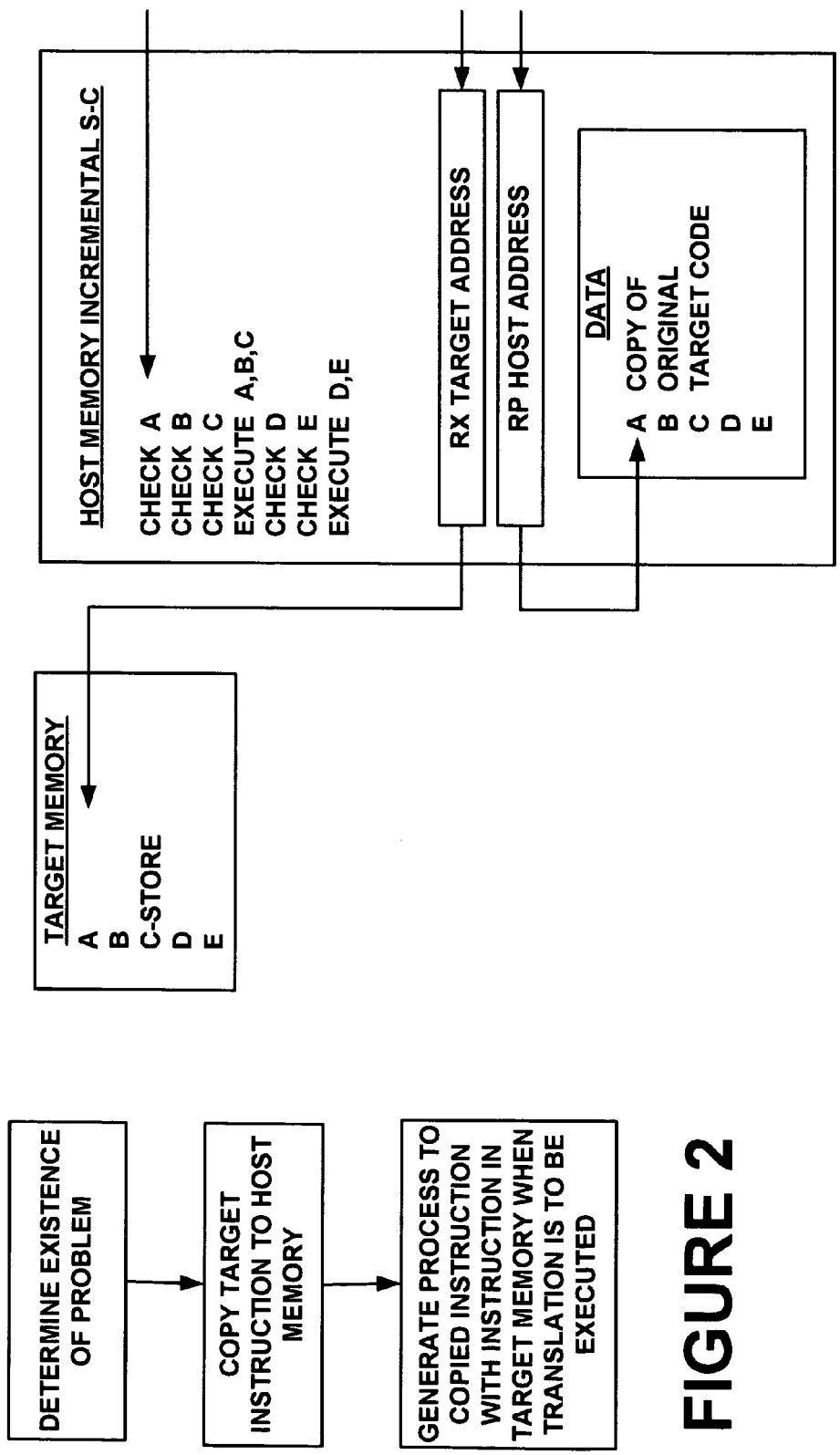
FIG. 2 is a flow chart illustrating the operation of a generalized embodiment of the present invention.

A test to detect T-bit exceptions or self-checking failures caused by writes to data areas of such instructions is first implemented in accordance with the generalized process illustrated in FIG. 2. When the problem is, detected, the first step is to use modified translation software to generate host instructions which, rather than encoding the fetch immediate or fetch displacement data, encode the address of the data in the target instruction and load the data each time they execute. In this way, a retranslation of the host instruction is not necessary when these data fields are the only things which change in a target instruction. The result is that when T-bit protection for the target instructions which has been translated is replaced by self-checking (or incremental self-checking), the process tests the target instruction except for the data field upon execution of the translation.

When this is done, a write to the data field of the target instruction does not affect the translated instruction in any way. If only the data changes in the target instruction, when the copy of the original target instructions is compared to the target instructions presently at the original address in target memory, the self-checking test will be passed since the instruction remains the same for all but the data fields for which the self-check has been eliminated. When the host translation is executed, the translation performs its usual operation of accessing the data field in the target image and thus automatically implements the change made to the data field of the target instruction without retranslation of the instruction. This allows self-checking to proceed without causing a self-checking fault to occur.

The self-checking process may be utilized to modify the T bit protection process in a somewhat different manner to provide more efficient operation in situations in which T bit exceptions occur somewhat less frequently and the target instructions are not changed. The T bit protection may be left in operation but modified so that a T bit exception causes a self-checking operation to occur only a single time. If the test of the self-checking operation shows that the copy of the target instructions stored in host memory and the target instructions stored at the original target address are the same, then the T bit process is reinstated for the translation. If the translation fails the test, then the translation is invalidated; and a new translation is prepared. As suggested, this form of self-checking (referred to as "revalidation") is effective in situations in which T bit exceptions are occurring infrequently. An advantage of this refined process is that it eliminates the time consuming process of self-checking on each execution of the translation. The process takes effect only when a T-bit exception actually occurs and then, only for one iteration if the test is met.

In one embodiment, revalidation is accomplished utilizing a data structure which is maintained to indicate the sub-areas of a memory page that are T bit protected and which translations translate target instructions from each sub-area. When a T bit fault for a sub-area occurs, all non-revalidating translations that translate target instructions from that sub-area are invalidated. The revalidating translations that translate target instructions from that sub-area are put in an "armed" state. The next time an armed revalidating translation is executed, it does a self check. If this demonstrates that the target instructions which were translated remain at the target memory address, the translation is disarmed, T bit protected (so that the next attempt to write to the T bit protected sub-area will generate a T bit exception), and executed normally. In the disarmed state, this translation executes normally without self checking until the next time a T bit fault causes it to be armed. If, when execution occurs for an armed translation, the self-check indicates that the target instructions have changed and are no longer those which were translated, the translation is invalidated and replaced in some manner.

The self-revalidating translation may incorporate the technique for fetching immediate and displacement fields for the target instructions it translates. In this case, the self check does not compare those immediate and displacement fields.

One embodiment of processes for carrying out this invention responds to an indication that a particular translation is a problem translation by creating a new process to replace the host translation of the target instructions. The new process is referred to in this specification as a "Zombie" process. This Zombie process is executed whenever the problem translation would have been executed. The Zombie process has a data structure which records whether there is a trial translation to be run and holds statistics on how often the trial translation has been executed and how many previous trial translations have been created. When a Zombie process is executed, it looks in the data structure to determine whether a trial translation exists that is to be executed. If there is a trial translation, the Zombie process records that it is being executed in the data structure and then starts the trial translation. The trial translation for the purpose of this explanation implements target instructions to be executed and carries out one of the processes to test the validity of the translation described above. For example, the process may be a basic self-checking process if the problem discovered requires such a process. Preferably, any self-checking process will be an incremental self-checking process. The process may be a self-revalidation process which responds to a T bit fault by instituting a one-time self-check of the translated instruction. The process may be a refined self-checking or revalidating process which has been modified to eliminate the test of data areas and which is used with a modified translation which includes instead of a data field a reference for accessing a data field. Other tests might be devised by those skilled in the art. If the test indicates the translation is still valid, the trial translation then continues with the original host translation.

Figure 5:
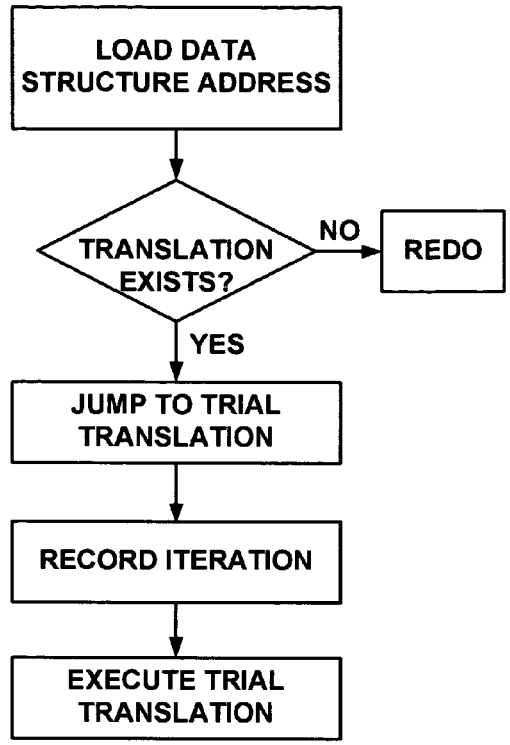
FIG. 5 is a flow chart illustrating the operation of a process implementing the present invention.

On the other hand, if the test process determines that the host instructions are no longer valid, then the trial translation is deleted; and the deletion is recorded in the data structure. The next time the Zombie is called, there will be no trial translation, so some different process of executing the target code such as a new translation must be implemented. This may include creating another trial translation and executing it. The general operation of a Zombie is illustrated in FIG. 5.

A Zombie process may be utilized in accordance with the invention to implement a plurality of the various forms of self-checking for any T-bit protected area. Since the different forms of protection have different efficiencies with respect to the different types of problems which may occasion a change from the T bit protection process, a sequence of different protections may be instituted. For example, a Zombie process may first be set to provide revalidation for a particular sub-area which has been the subject of a T bit exception. A revalidation process will function efficiently so long as T bit exceptions occur infrequently. If the sub-area is being written to quite often, then the Zombie may replace the revalidation process with the incremental self-checking process which removes the T bit protection and self-tests each attempt to execute the translation. If self-checking fails and would cause invalidation of the translation, the Zombie may invalidate the translation, retranslate with the data fields modified to access the original target instruction, and provide refined self-checking to test all but the data fields. In this manner, the process allows the type of problem which is occurring to determine the method for testing which allows the most efficient form of validity test.

At some point, a trial translation will have been executed successfully for an extended period; and the Zombie process can be removed and replaced by the trial translation.

If no trial translation executes for a sufficiently long period of time to replace the Zombie process, then the Zombie process may begin keeping multiple trial translations. If this is done, when a trial translation executes and fails its self check, then instead of invalidating the translation, the Zombie process tries to execute the next trial translation. If no trial translation executes successfully, the Zombie process uses some other means to execute the target instructions including possibly making a new trial translation. If a trial translation does not execute successfully after many attempts, it may be invalidated; and if a Zombie process accumulates too many processes, it may eliminate one or more of them. This technique is used to deal with the situation in which a handful of code templates are being written to some of target memory and a handful of translations will cover the different cases.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer which translates instructions from a target instruction set to a host instruction set, a method comprising:
   at a time subsequent to translating target instructions into translated target instructions, determining whether a detecting system may be slowing operation of the computer with respect to the execution of the translated target instructions, wherein the detecting system detects changes to a memory location containing target instructions that have been translated; and
   if the detecting system is slowing operation:
      storing copies of the particular target instructions,
      disabling the detecting system,
      comparing the copies and target instructions at the memory location to determine whether the memory location has been altered;
      executing the translated target instructions if the copies and target instructions compare, and
      disabling the translated target instructions if the copies and target instructions do not compare.

2. The method of claim 1, further comprising:
   comparing the copies and target instructions for a first increment of copies up to and including a store instruction of the target instructions; and
   subsequently comparing the copies and target instructions for a remaining increment of copies after execution of translated target instructions translated from the first increment of copies.

3. The method of claim 2, further comprising:
   resolving conflicts by executing the translation in another way if a load instruction used to implement the comparing of the copies and the target instructions at the memory location has been reordered with respect to the store instruction.

4. The method of claim 3, further comprising:
   ending translation of target instructions into translated target instructions and committing state when a store occurs to target memory.

5. A computer system that translates target instructions from a target instruction set into host instructions from a host instruction set, the computer system having computer readable code which when executed by the computer system cause the computer system to implement a method for invalidating translated host instructions, comprising:
   translating a plurality of target instructions into a resulting plurality of host instructions;
   subsequent to translating target instructions at a memory location, testing whether the target instructions at the memory location have changed subsequent to the translating by examining a bit indicator associated with the memory location;
   if the testing is slowing the computer system, initiating a checking process comprising:
   storing a copy of the target instructions;
   subsequently comparing the copy of the target instructions with the target instructions at the memory location; and invalidating the host instructions if the target instructions have changed.

6. The computer system of claim 5 further comprising:

initiating the checking when the testing indicates a page containing the target instructions has been changed.

7. The computer system of claim 5 further comprising:

initiating the checking when at least one of a plurality of sub areas of a page containing the target instructions has been changed.

8. The computer system of claim 5 further comprising:

testing for an indicator that the target instructions have been overwritten by examining a plurality of bit indicators; and initiating the checking upon an indication that the testing may be slowing operation of the computer.

9. In a computer system that translates target instructions from a target instruction set into host instructions from a host instruction set, a method for checking a sequence of target instructions for changes, comprising:

subsequent to translating a sequence of target instructions at a memory location, testing whether the sequence of target instructions at the memory location have changed subsequent to the translating by examining a bit indicator associated with the memory location;

determining whether the testing is slowing the operation of the computer system;

if the testing is slowing the operation of the computer system, initiating a checking process comprising:

storing a copy of the sequence of target instructions at the memory location;

subsequently comparing the copy with the sequence of target instructions at the memory location; and invalidating the host instructions if the sequence of target instructions has been altered.

10. The method of claim 9 further comprising:

initiating the checking when a page containing the target instructions has been changed.

11. The method of claim 10 further comprising:

initiating the checking when the bit indicator indicates that at least one of a plurality of sub areas of a page containing the target instructions has been changed.

12. The method of claim 9 further comprising:

testing for an indicator that the target instructions have been overwritten by examining a plurality of bit indicators; and initiating the checking upon an indication that the testing may be slowing operation of the computer.

* * * * *